(12) United States Patent
Chai et al.

(10) Patent No.: US 11,572,946 B2
(45) Date of Patent: Feb. 7, 2023

(54) SHIFT CONTROL DEVICE AND SHIFT CONTROL METHOD FOR VEHICLE

(71) Applicants: Hyundai Motor Company, Seoul (KR); Kia Corporation, Seoul (KR)

(72) Inventors: Min Jae Chai, Gwangmyeong-Si (KR); Byeong Wook Jeon, Seoul (KR); Yong Uk Shin, Seongnam-Si (KR); Dong Hoon Jeong, Hwaseong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/458,153

(22) Filed: Aug. 26, 2021

(65) Prior Publication Data
US 2022/0333681 A1    Oct. 20, 2022

(30) Foreign Application Priority Data
Apr. 14, 2021    (KR) .................... 10-2021-0048772

(51) Int. Cl.
| *F16H 61/02* | (2006.01) |
| *F16H 59/44* | (2006.01) |
| *F16H 59/18* | (2006.01) |
| *F16H 59/54* | (2006.01) |
| *F16H 59/66* | (2006.01) |

(52) U.S. Cl.
CPC ............ *F16H 59/44* (2013.01); *F16H 59/18* (2013.01); *F16H 59/54* (2013.01); *F16H 59/66* (2013.01); *F16H 61/0213* (2013.01); *F16H 2059/186* (2013.01); *F16H 2059/663* (2013.01); *F16H 2059/666* (2013.01)

(58) Field of Classification Search
CPC .......... F16H 59/18; F16H 59/44; F16H 59/54; F16H 59/66; F16H 2059/186; F16H 2059/663; F16H 2059/666; F16H 61/0213
See application file for complete search history.

(56) References Cited

U.S. PATENT DOCUMENTS

| 2009/0192019 | A1* | 7/2009 | Groner | ................... B60T 7/122 477/195 |
| 2018/0170347 | A1* | 6/2018 | Kim | ................ B60W 30/18127 |
| 2018/0265090 | A1* | 9/2018 | Sharma | ............. B60W 50/0097 |
| 2019/0257415 | A1* | 8/2019 | Kook | .................. F16H 61/0213 |
| 2020/0156480 | A1* | 5/2020 | Park | .................... B60L 15/2045 |
| 2020/0339100 | A1* | 10/2020 | Gaither | ................ B60W 20/40 |
| 2021/0172515 | A1 | 6/2021 | Jeon et al. | |

FOREIGN PATENT DOCUMENTS

KR    10-2021-0073706 A    6/2021

* cited by examiner

*Primary Examiner* — Edwin A Young
(74) *Attorney, Agent, or Firm* — Morgan, Lewis & Bockius LLP (57) ABSTRACT

A shift control device and a shift control method for a vehicle may include a storage to store a table having a target speed corresponding to a speed of the vehicle at a starting point of a coasting operation of the vehicle and a speed profile corresponding to each of gearshifting stages of the vehicle with respect to each downhill slope, and a controller to control gearshifting of the vehicle traveling in the coasting operation on a downhill road, according to the table and the speed profile, to control the speed of the vehicle, according to a driver intent of accelerating the vehicle and a driver intent of traveling the vehicle at a constant speed.

19 Claims, 5 Drawing Sheets

SHIFT CONTROL DEVICE AND SHIFT CONTROL METHOD FOR VEHICLE

CROSS-REFERENCE TO RELATED APPLICATION

The present application claims priority to Korean Patent Application No. 10-2021-0048772, filed on Apr. 14, 2021, the entire contents of which is incorporated herein for all purposes by this reference.

BACKGROUND OF THE INVENTION

Field of the Invention

The present invention relates to a technology of regulating the speed of a vehicle by controlling gear shifting (upshift or downshift) of the vehicle travelling in a coasting operation on a downhill road.

Description of Related Art

In general, a driver drives (hereinafter, referred to as a coasting operation) a vehicle on a downhill road without depressing an accelerator pedal and a brake pedal of the vehicle to maintain the speed of the vehicle to be constant. In the instant case, the concept of the coasting operation includes the concepts of an ON status of an engine clutch as well as an OFF status (an N stage of a gearshift) of the engine clutch.

The slope of a downhill road is frequently changed, so that the speed of the vehicle traveling in the coasting operation on the downhill road is frequently changed. Accordingly, to maintain the speed of the vehicle to be constant, a driver has to depress an accelerator pedal when the speed of the vehicle is decreased by an engine brake, and has to depress a brake pedal when the speed of the vehicle is increased due to the rapid slope of the downhill road.

As described above, when the driver depresses the accelerator pedal, the fuel consumption may be increased. When the driver depresses the brake pedal, the brake pedal may be abraded or deteriorated. Furthermore, the situation that the driver manipulates the accelerator pedal or the brake pedal may cause the driver to be inconvenient.

According to the related art of controlling the gearshifting of the vehicle traveling in the coasting operation on the downhill road, the gearshifting of the vehicle is controlled such that the vehicle travels at a constant speed without considering the intent of the driver in the coasting operation, causing the driver to be inconvenient. According to the related art, the driver who wants to accelerate the vehicle fails to be satisfied in the coasting operation on the downhill road.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a shift control device and a shift control method for a vehicle, configured for providing a table having a target speed corresponding to the speed of the vehicle at a starting time point of a coasting operation, and a speed profile corresponding to each of gearshifting stages of the vehicle with respect to each downhill slope, and controlling the gearshifting of the vehicle traveling in the coasting operation on a downhill road, based on the table and the speed profile, controlling the speed of the vehicle based on a driver intent of accelerating the vehicle and a driver intent of driving the vehicle at a constant speed.

The technical problems to be solved by the present included are not limited to the aforementioned problems, and any other technical problems not mentioned herein will be clearly understood from the following description by those skilled in the art to which various exemplary embodiments of the present invention pertains. Furthermore, it may be easily understood that the objects and the features of the present invention are realized by means and the combination of the means claimed in appended claims.

According to various aspects of the present invention, a shift control device for a vehicle may include a storage to store a table having a target speed corresponding to a speed of the vehicle at a starting point of a coasting operation of the vehicle and a speed profile corresponding to each of gearshifting stages of the vehicle with respect to each downhill slop slope, and a controller to control gearshifting of the vehicle traveling in the coasting operation on a downhill road, based on the table and the speed profile.

According to various exemplary embodiments of the present invention, the target speed may be higher than the speed of the vehicle.

According to various exemplary embodiments of the present invention, the controller may be configured to control the gearshifting of the vehicle such that the speed of the vehicle is increased to the target speed.

According to various exemplary embodiments of the present invention, the controller may upshift a gearshifting stage of the vehicle or shift the gearshifting stage to a neutral (N) stage.

According to various exemplary embodiments of the present invention, the controller may be configured to control the gearshifting of the vehicle to maintain a speed of the vehicle, which is measured, at a time point at which depressing of the brake pedal is released, when the controller concludes that the depressing of the brake pedal is released.

According to various exemplary embodiments of the present invention, the controller may perform at least one of an operation of maintaining a current gearshifting stage of the vehicle, an downshift operation of the current gearshifting stage or an upshift operation of the current gearshifting stage, to maintain the speed of the vehicle, which is measured at the time point at which the depressing of the brake pedal is released.

According to various exemplary embodiments of the present invention, the controller may be configured to determine the vehicle as travelling in the coasting operation, when the controller concludes that the APS value is '0', and the BPS value is '0'.

According to various exemplary embodiments of the present invention, the controller may be configured to determine the vehicle as traveling on the downhill road, when the controller concludes that the collected slope is less than a reference slope.

According to various exemplary embodiments of the present invention, in the speed profile corresponding to each of the gearshifting stages of the vehicle, an N stage of the gearshifting stages of the vehicle indicates the highest speed, and a higher stage indicates a higher speed of the vehicle.

According to various aspects of the present invention, a shift control method of a vehicle includes storing, by a storage, a table having a target speed corresponding to a speed of the vehicle at a starting point of a coasting operation of the vehicle and a speed profile corresponding to each of the gearshifting stages of the vehicle with respect to each downhill slope, and controlling, by a controller electrically connected to the storage, gearshifting of the vehicle traveling in the coasting operation on a downhill road based on the table and the speed profile.

According to various exemplary embodiments of the present invention, the shift control method may include controlling the gearshifting of the vehicle such that the speed of the vehicle is increased to the target speed, detecting that a brake pedal mounted in the vehicle is depressed and the brake pedal depressed is released, measuring a speed of the vehicle at a time point at which the brake pedal depressed is released, and controlling the gearshifting of the vehicle such that the measured speed of the vehicle is maintained.

According to various exemplary embodiments of the present invention, the shift control method may include upshifting a gearshifting stage of the vehicle or shifting the gearshifting stage to a neutral (N) stage.

According to various exemplary embodiments of the present invention, the shift control method may include performing at least one of an operation of maintaining a current gearshifting stage of the vehicle, a downshift operation of the current gearshifting stage or an upshift operation of the current gearshifting stage.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various exemplary embodiments of the present invention will be described in detail with reference to the exemplary drawings. In adding the reference numerals to the components of each drawing, it should be noted that the identical or equivalent component is designated by the identical numeral even when they are displayed on other drawings. Furthermore, in describing the exemplary embodiment of the present invention, a detailed description of well-known features or functions will be ruled out in order not to unnecessarily obscure the gist of the present invention.

In addition, in the following description of components according to various exemplary embodiments of the present invention, the terms 'first', 'second', 'A', B', '(a)', and '(b)' may be used. These terms are merely intended to distinguish one component from another component, and the terms do not limit the nature, sequence or order of the constituent components. In addition, unless otherwise defined, all terms used herein, including technical or scientific terms, have the same meanings as those generally understood by those skilled in the art to which various exemplary embodiments of the present invention pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 1:
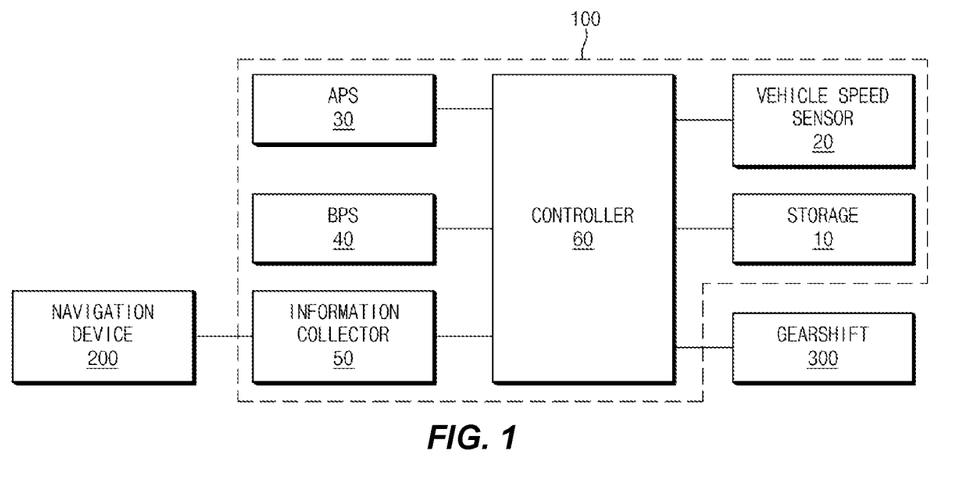
FIG. 1 is a view exemplarily illustrating the configuration of a shift control device configured for a vehicle, according to various exemplary embodiments of the present invention.

FIG. 1 is a view illustrating the configuration of a shift control device configured for a vehicle, according to various exemplary embodiments of the present invention.

As illustrated in FIG. 1, according to various exemplary embodiments of the present invention, a shift control device 100 for a vehicle may include a storage 10, a vehicle speed sensor 20, an accelerator position sensor (APS) 30, a brake position sensor (BPS) 40, an information collector 50, and a controller 60. In the instant case, according to various exemplary embodiments of the present invention, the components may be combined into each other to be implemented in one form, or some components may be omitted, depending on the manners of reproducing the shift control device 100 of the vehicle.

Regarding the components, the storage 10 may store various logics, various algorithm, and various programs required in the procedure of controlling (shift control) gearshifting of the vehicle traveling in a coasting operation on a downhill road, by considering a driver intent of accelerating the vehicle and a driver intent of driving the vehicle at the constant speed, based on a table having a target speed corresponding to the speed of the vehicle at a starting time point of the coasting operation, and a speed profile corresponding to each of gearshifting stages of the vehicle with respect to each downhill slope. For reference, the concept of the coasting operation includes the concept of an OFF status (a gearshifting stage is the N stage) of an engine clutch in the status that a driver does not manipulate an accelerator pedal (APS value='0'), and the status that the driver does not manipulate a brake pedal (BPS value='0'), and the concept of an ON status of the engine clutch in the state that a driver does not manipulate the accelerator pedal (APS value='0'), and the state that the driver does not manipulate a brake pedal (BPS value='0').

The storage 10 may store the table having the target speed corresponding to the speed of the vehicle at the starting time point of the coasting operation. For example, the table having the target speed is illustrates as in the following table 1.

TABLE 1

| Current speed of vehicle | Target speed of vehicle |
|---|---|
| 50 kph | 70 kph |
| 60 kph | 75 kph |
| 70 kph | 80 kph |

The more detailed target speed based on the current speed of the vehicle may be set by applying an interpolation manner to table 1. For example, on the assumption that the current speed of the vehicle is 55 kph, the target speed is 72.5 kph.

The storage 10 may store a speed profile corresponding to each of gearshifting stages of the vehicle with respect to each downhill slope, which is applied to the vehicle traveling in the coasting operation on the downhill road. The speed profile is illustrated as in FIG. 2 by way of example.

Figure 2:
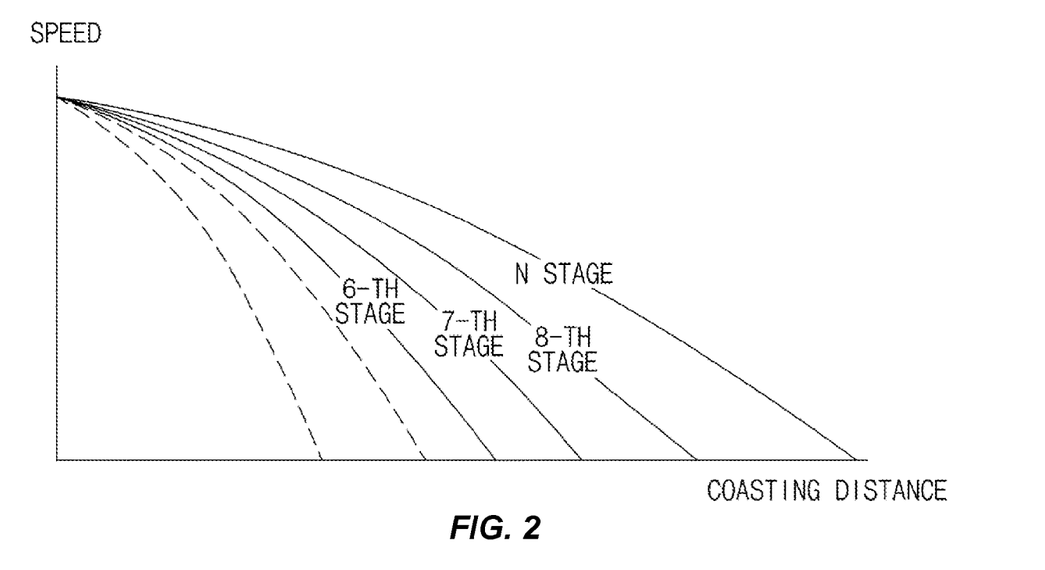
FIG. 2 is a view exemplarily illustrating a speed profile provided in a shift control device configured for a vehicle, according to various exemplary embodiments of the present invention.

FIG. 2 is a view exemplarily illustrating a speed profile provided in a shift control device configured for a vehicle, according to various exemplary embodiments of the present invention, and illustrating a speed profile corresponding to each of gearshifting stages of the vehicle with respect to a first slope.

As illustrated in FIG. 2, a vertical axis represents an initial speed and a horizontal axis represents a coasting distance. On the assumption that the initial speed is equal as illustrated in FIG. 2, the N stage indicates the longest coasting distance, and a higher gearshifting stage indicates a longer coasting distance.

The storage 10 may store a reference slope (for example, −5%) and a reference distance (for example, 300 m) as conditions of starting the shift control of the vehicle.

The storage 10 may store a reference variation (for example, 10 KPH/sec or 2.8 m/s) of the vehicle speed.

The storage 10 may store a map having a gearshifting stage (pattern gearshifting stage) corresponding to a pattern. Such a map is a generally-known technology applied to the vehicle and is not the subject matter of the present invention. Accordingly, the details thereof will be omitted hereinafter.

The storage 10 may store a target distance (for example, 100 m) indicating a distance between a current position of the vehicle to a target position of the vehicle. In the instant case, the target distance may be varied depending on the current speed of the vehicle.

The storage 10 may store a reference speed range (for example, the range of 40 kph to 150 KPH) of the vehicle.

The storage 10 may include at least one storage medium of a memory in a flash memory type, a hard disk type, a micro type, the type of a card (e.g., a Security Digital (SD) card or an eXtreme digital card), a Random Access Memory (RAM), a Static RAM (SRAM), a Read Only Memory (ROM), a Programmable ROM (PROM), an Electrically Erasable and Programmable ROM (EEPROM), a magnetic RAM (MRAM), a magnetic disk-type memory, or an optical disk-type memory.

The vehicle speed sensor 20 may measure the speed of the vehicle. Although it has been described that the speed of the vehicle is directly measured by use of the vehicle speed sensor 20 according to various exemplary embodiments of the present invention, the speed of the vehicle may be obtained through a vehicle network according to another exemplary embodiment of the present invention. In the instant case, the vehicle network includes a controller area network (CAN), a local interconnect network (LIN), a FlexRay, a media oriented systems transport (MOST), or the like.

The APS 30 is a sensor to measure a depressing degree (hereinafter, referred to as an "APS value") of the accelerator pedal mounted in the vehicle. When the driver does not manipulate the accelerator pedal (APS OFF), the APS value is 0%. When the driver fully depresses the accelerator pedal, the APS value is 100%. In the instant case, the status in which the driver depresses the accelerator pedal is referred as an 'APS ON' status. Although it has been described that the APS value is directly measured by use of the APS 30 according to various exemplary embodiments of the present invention, the APS value may be obtained through a vehicle network according to another exemplary embodiment of the present invention.

The BPS 40 is a sensor to measure a depressing degree (hereinafter, referred to as a "BPS value") of the brake pedal mounted in the vehicle. When the driver does not manipulate the brake pedal (BPS OFF), the BPS value is 0%. When the driver fully depresses the brake pedal, the BPS value is 100%. In the instant case, the status in which the driver depresses the brake pedal is referred as an 'BPS ON' status. Although it has been described that the BPS value is directly measured by use of the BPS 40 according to various exemplary embodiments of the present invention, the BPS value may be obtained through a vehicle network according to another exemplary embodiment of the present invention.

The information collector 50, which is a module internetworking with a navigation device 200 provided in the vehicle, may collect, from the navigation device 200, information (for example, Global Positioning System (GPS) information) on a current position of the vehicle and information on the slope of a road on which the vehicle travels.

The information collector 50 may further collect, from the navigation device 200, information on the curvature of the front road, the current speed of the vehicle, or a target position corresponding to a target distance of the vehicle.

The information collector 50 may obtain information on a distance between the current position of the vehicle and the target position of the vehicle, from the navigation device 200 in real time.

The controller 60 performs the whole control operations such that the components perform the intrinsic functions thereof. Furthermore, the controller 60 may be implemented in a form of hardware or software, and may be implemented in a form of the combination of the hardware and the software. The controller 60 may be implemented with a micro-processor, but the present invention is not limited thereto.

The controller 60 may perform various control operations in the procedure of controlling gearshifting of the vehicle traveling in a coasting operation on a downhill road, by considering a driver intent of accelerating the vehicle and a driver intent of driving the vehicle at the constant speed, based on a table having a target speed corresponding to the speed of the vehicle at a starting time point of the coasting operation, and a speed profile corresponding to each of gearshifting stages of the vehicle with respect to each downhill slope.

The controller 60 may control the information collector 50 to obtain, from the navigation device 200, information on the slope of the road on which the vehicle travels, and may determine whether the slope obtained through the information collector 50 exceeds a reference slope.

The controller 60 may determine whether the vehicle travels in the coasting operation, based on the APS value measured by the APS 30, and on the BPS value measured by the BPS 40. In other words, the controller 60 may determine the vehicle as traveling in the coasting operation, when the APS value measured by the APS 30 is '0', and the BPS value measured by the BPS 40 is '0'.

The controller 60 may determine whether the speed of the vehicle measured by the vehicle speed sensor 20 is included in the reference speed range.

The controller 60 may detect a time point, in which the brake pedal is depressed, and a time point in which the brake pedal depressed is released, through the BPS 40.

The controller 60 may control the vehicle speed sensor 20 to measure the speed of the vehicle at the time point in which the brake pedal mounted in the vehicle is released from being depressed.

Hereinafter, the procedure that the controller 60 controls gearshifting of the vehicle will be described with reference to FIG. 3.

Figure 3:
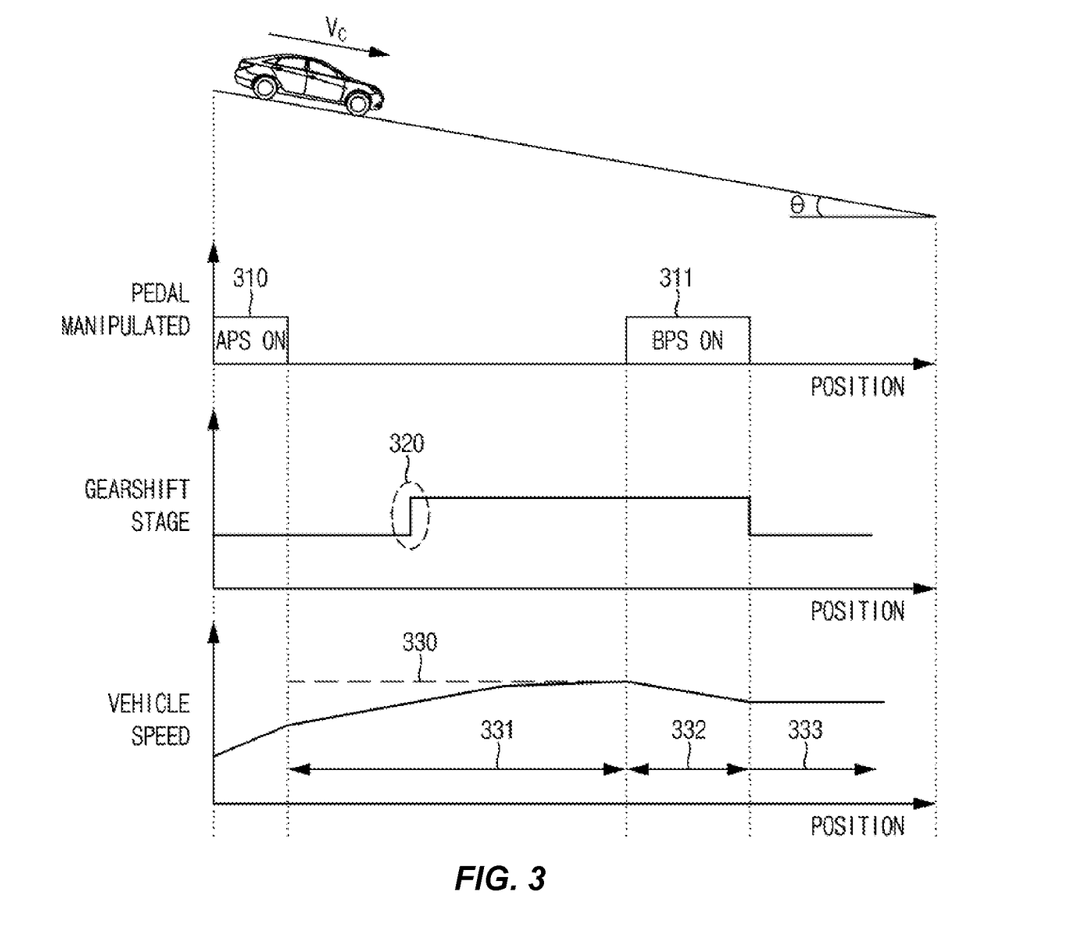
FIG. 3 is a view exemplarily illustrating the procedure in which a controller provided in a shift control device configured for a vehicle controls gearshifting of a vehicle, according to various exemplary embodiments of the present invention.

FIG. 3 is a view exemplarily illustrating the procedure in which a controller provided in a shift control device configured for a vehicle controls gearshifting of a vehicle, according to various exemplary embodiments of the present invention.

In FIG. 3, reference numeral '310' indicates a section (APS ON) in which the driver depresses an accelerator pedal, reference numeral '311' indicates a section (BPS ON) in which the driver depresses a brake pedal, and reference numeral '320' indicates a time point in which the controller 60 performs gear shifting to follow a target speed (see reference numeral '330') during the coasting operation. Furthermore, reference numeral '331' indicates a section in which the controller 60 follows the target speed 330 during the coasting operation, reference numeral '332' indicates a section in which the driver depresses the brake pedal to decrease the speed of the vehicle, and reference numeral '333' indicates that the controller 60 maintains the speed of the vehicle during the coasting operation.

The controller 60 may controls the gearshifting of the vehicle such that the current speed of the vehicle follows the target speed in the section indicated by reference numeral '331' (see reference numeral 320), and controls the gearshifting of the vehicle such that the current speed of the vehicle is maintained in the section indicated by reference numeral '333'. In the instant case, the controller 60 may maintain or upshift the gearshifting stage of the vehicle such that the current speed of the vehicle follows the target speed in the section indicated by reference numeral '331'. Furthermore, the controller 60 may perform at least one of an operation of maintaining a current gearshifting stage of the vehicle, an operation of downshifting the current gearshifting stage of the vehicle, or an operation of upshifting the current gearshifting stage of the vehicle to maintain the current speed of the vehicle in the section indicated by reference numeral '333'.

The controller 60 prohibits the upshift of the gearshifting stage in the section indicated by reference numeral '332'. In the instant case, the deceleration of the vehicle in the section indicated by reference numeral '332' is caused by braking instead of gear shifting.

Figure 4:
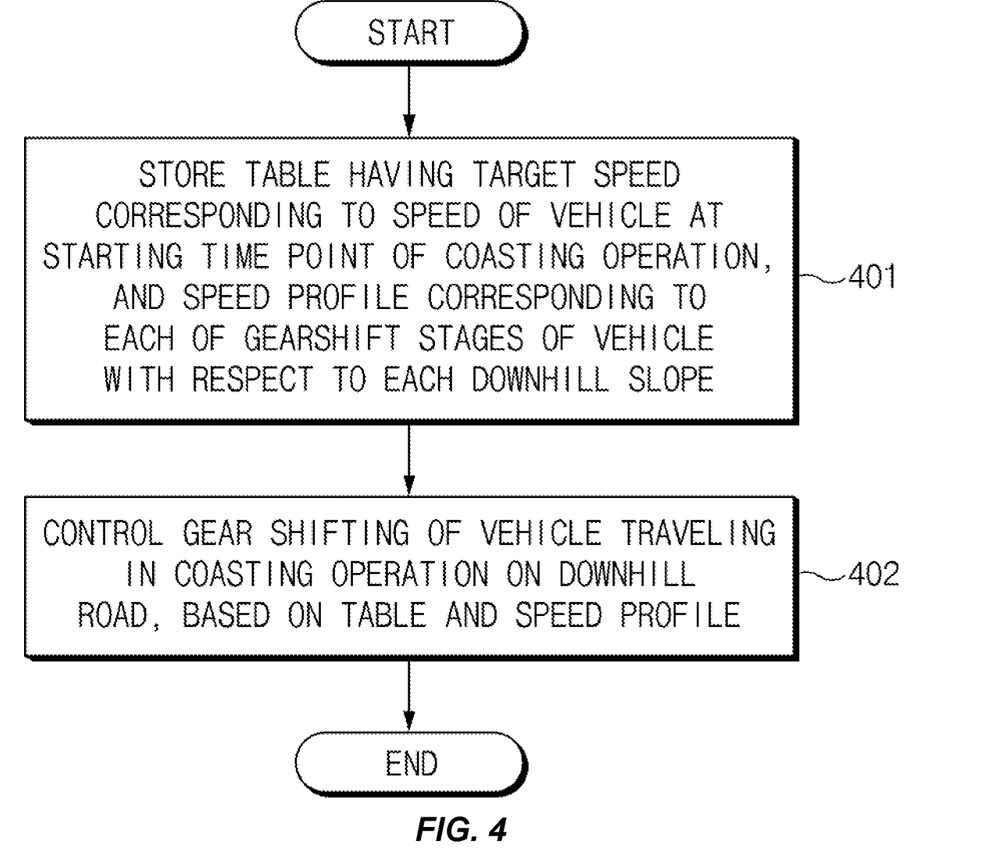
FIG. 4 is a flowchart illustrating a shift control method of a vehicle, according to various exemplary embodiments of the present invention.

FIG. 4 is a flowchart illustrating a shift control method for a vehicle, according to various exemplary embodiments of the present invention.

First, the storage 10 stores a table having a target speed corresponding to the speed of the vehicle at a starting time point of the coasting operation, and a speed profile corresponding to each of gearshifting stages of the vehicle with respect to each downhill slope (401).

Thereafter, the controller 60 controls the gearshifting of the vehicle traveling in the coasting operation on the downhill road, based on the table and the speed profile (402).

Figure 5:
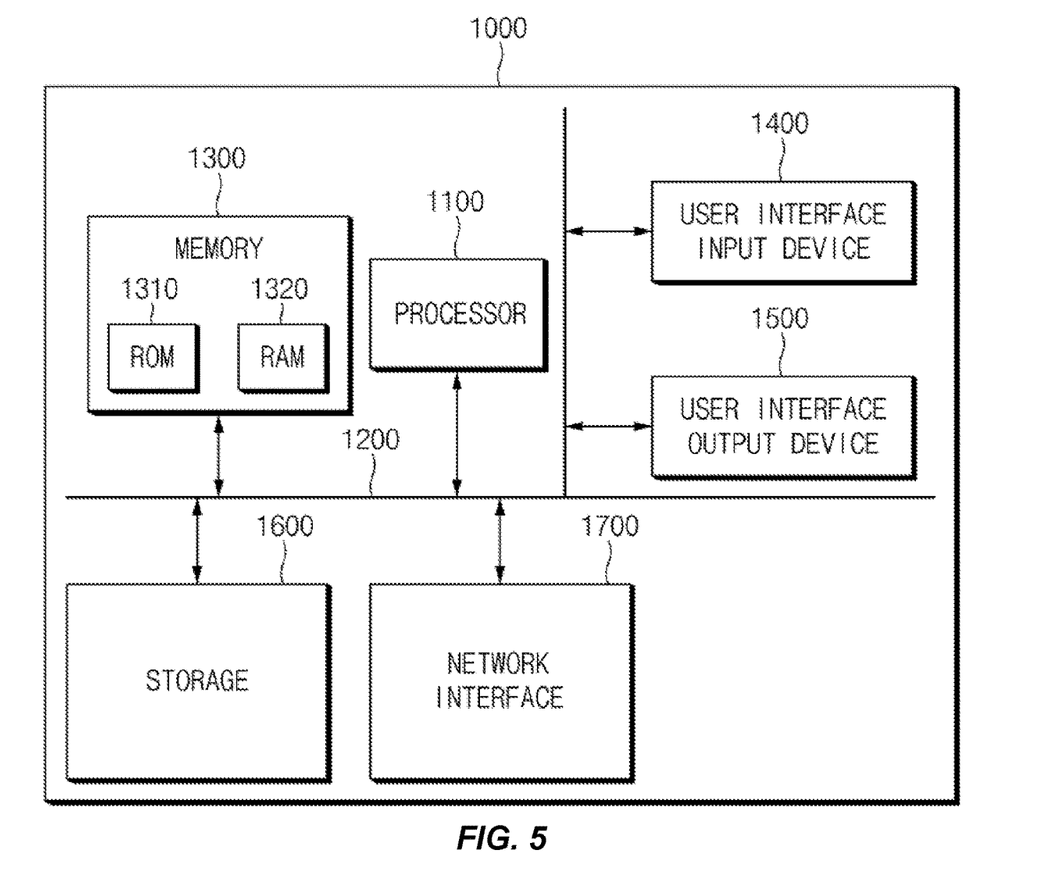
FIG. 5 is a block diagram illustrating a computing system to execute a shift control method of a vehicle, according to various exemplary embodiments of the present invention.

FIG. 5 is a block diagram illustrating a computing system to execute a shift control method for a vehicle, according to various exemplary embodiments of the present invention.

Referring to FIG. 5, according to various exemplary embodiments of the present invention, the shift control method for the vehicle may be implemented through the computing system. A computing system 1000 may include at least one processor 1100, a memory 1300, a user interface input device 1400, a user interface output device 1500, a storage 1600, and a network interface 1700, which are connected to each other via a system bus 1200.

The processor 1100 may be a central processing unit (CPU) or a semiconductor device configured for processing instructions stored in the memory 1300 and/or the storage 1600. Each of the memory 1300 and the storage 1600 may include various types of volatile or non-volatile storage media. For example, the memory 1300 may include a read only memory (ROM) 1310 and a random access memory (RAM) 1320.

Thus, the operations of the methods or algorithms described in connection with the exemplary embodiments included in various exemplary embodiments of the present invention may be directly implemented with a hardware module, a software module, or the combinations thereof, executed by the processor 1100. The software module may reside on a storage medium (i.e., the memory 1300 or the storage 1600), such as a RAM memory, a flash memory, a ROM, memory an erasable and programmable ROM (EPROM), an electrically EPROM (EEPROM), a register, a hard disc, a solid state drive (SSD), a removable disc, or a compact disc-ROM (CD-ROM). The exemplary storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may reside as separate components of the user terminal.

As described above, in the shift control device and the shift control method for the vehicle according to various exemplary embodiments of the present invention, the table having the target speed corresponding to the speed of the vehicle at the starting time point of a coasting operation, and the speed profile corresponding to each gearshifting stage of the vehicle with respect to each downhill slope are provided, and the gearshifting of the vehicle traveling in the coasting operation on the downhill road is controlled, based on the table and the speed profile, controlling the speed of the vehicle based on the driver intent of accelerating the vehicle and the driver intent of driving the vehicle at the constant speed.

Hereinabove, although the present invention has been described with reference to exemplary embodiments and the accompanying drawings, the present invention is not limited thereto, but may be variously modified and altered by those skilled in the art to which various exemplary embodiments of the present invention pertains without departing from the spirit and scope of the present invention claimed in the following claims.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A shift control device for a vehicle, the shift control device comprising:
   a storage configured to store a table having a target speed corresponding to a speed of the vehicle at a starting point of a coasting operation of the vehicle and a speed profile corresponding to each of gearshifting stages of the vehicle with respect to each downhill slope; and
   a controller electrically connected to the storage and configured to control gearshifting of the vehicle traveling in the coasting operation on a downhill road, according to the table and the speed profile.

2. The shift control device of claim 1, wherein the target speed is higher than the speed of the vehicle.

3. The shift control device of claim 2, wherein the controller is configured to control the gearshifting of the vehicle so that the speed of the vehicle is increased to the target speed.

4. The shift control device of claim 3, wherein the controller is configured to upshift a gearshifting stage of the vehicle or to shift the gearshifting stage to a neutral (N) stage.

5. The shift control device of claim 1, further including:
   a sensor electrically connected to the controller and configured to measure a brake position sensor (BPS) value representing a depressing degree of a brake pedal mounted in the vehicle.

6. The shift control device of claim 5, wherein the controller is configured to control the gearshifting of the vehicle to maintain a speed of the vehicle, which is measured at a time point at which depressing of the brake pedal is released, when the controller concludes that the depressing of the brake pedal is released.

7. The shift control device of claim 6, wherein the controller is configured to perform at least one of an operation of maintaining a current gearshifting stage of the vehicle, an operation of downshifting the current gearshifting stage, or an operation of upshifting the current gearshifting stage, to maintain the speed of the vehicle, which is measured at the time point at which the depressing of the brake pedal depressed is released.

8. The shift control device of claim 5, further including:
   a sensor electrically connected to the controller and configured to measure an accelerator position sensor (APS) value representing a depressing degree of an accelerator pedal mounted in the vehicle.

9. The shift control device of claim 8, wherein the controller is configured to determine the vehicle as travelling in the coasting operation, when the controller concludes that the APS value is '0', and the BPS value is '0'.

10. The shift control device of claim 1, further including:
    a navigation device configured to collect a slope of a road on which the vehicle travels.

11. The shift control device of claim 10, wherein the controller is configured to determine the vehicle as traveling on the downhill road, when the controller concludes that the collected slope is less than a reference slope.

12. The shift control device of claim 1, wherein, in the speed profile corresponding to each of the gearshifting stages of the vehicle, an N stage of the gearshifting stages of the vehicle indicates a highest speed, and a higher gearshifting stage indicates a higher speed of the vehicle.

13. A shift control method for a vehicle, the shift control method comprising:
    storing, by a storage, a table having a target speed corresponding to a speed of the vehicle at a starting point of a coasting operation of the vehicle and a speed profile corresponding to each of gearshifting stages of the vehicle with respect to each downhill slope; and
    controlling, by a controller electrically connected to the storage, gearshifting of the vehicle traveling in the coasting operation on a downhill road, according to the table and the speed profile.

14. The shift control method of claim 13, wherein the controlling of the gearshifting of the vehicle includes:
    controlling the gearshifting of the vehicle so that the speed of the vehicle is increased to the target speed;
    detecting a time point at which a brake pedal mounted in the vehicle is depressed and a time point at which the brake pedal depressed is released;
    measuring a speed of the vehicle at the time point at which the brake pedal depressed is released; and
    controlling the gearshifting of the vehicle so that the speed of the vehicle measured at the time point at which the brake pedal depressed is released is maintained.

15. The shift control method of claim 14, wherein the controlling of the gearshifting of the vehicle so that the speed of the vehicle is increased to the target speed includes:
    upshifting a gearshifting stage of the vehicle or shifting the gearshifting stage to a neutral (N) stage.

16. The shift control method of claim 14, wherein the controlling of the gearshifting of the vehicle so that the measured speed of the vehicle is maintained includes:
    performing at least one of an operation of maintaining a current gearshifting stage of the vehicle, an operation of downshifting the current gearshifting stage, or an operation of upshifting the current gearshifting stage.

17. The shift control method of claim 14, wherein, in the speed profile corresponding to each of the gearshifting stages of the vehicle, an N stage of the gearshifting stages of the vehicle indicates a highest speed, and a higher gearshifting stage indicates a higher speed of the vehicle.

18. The shift control method of claim 13, wherein the controller is configured to determine the vehicle as travelling in the coasting operation, when the controller concludes that an accelerator position sensor (APS) value is '0', and a BPS value is '0'.

19. The shift control method of claim 13,
wherein a navigation device is configured to collect a slope of a road on which the vehicle travels, and
wherein the controller is configured to determine the vehicle as traveling on the downhill road, when the controller concludes that the collected slope is less than a reference slope.

* * * * *